3,084,001
DISCHARGE MEANS FOR STORAGE VESSELS
Robert F. Loomis, Allentown, Pa., assignor to
Fuller Company, a corporation of Delaware
Filed Dec. 23, 1958, Ser. No. 782,433
13 Claims. (Cl. 302—53)

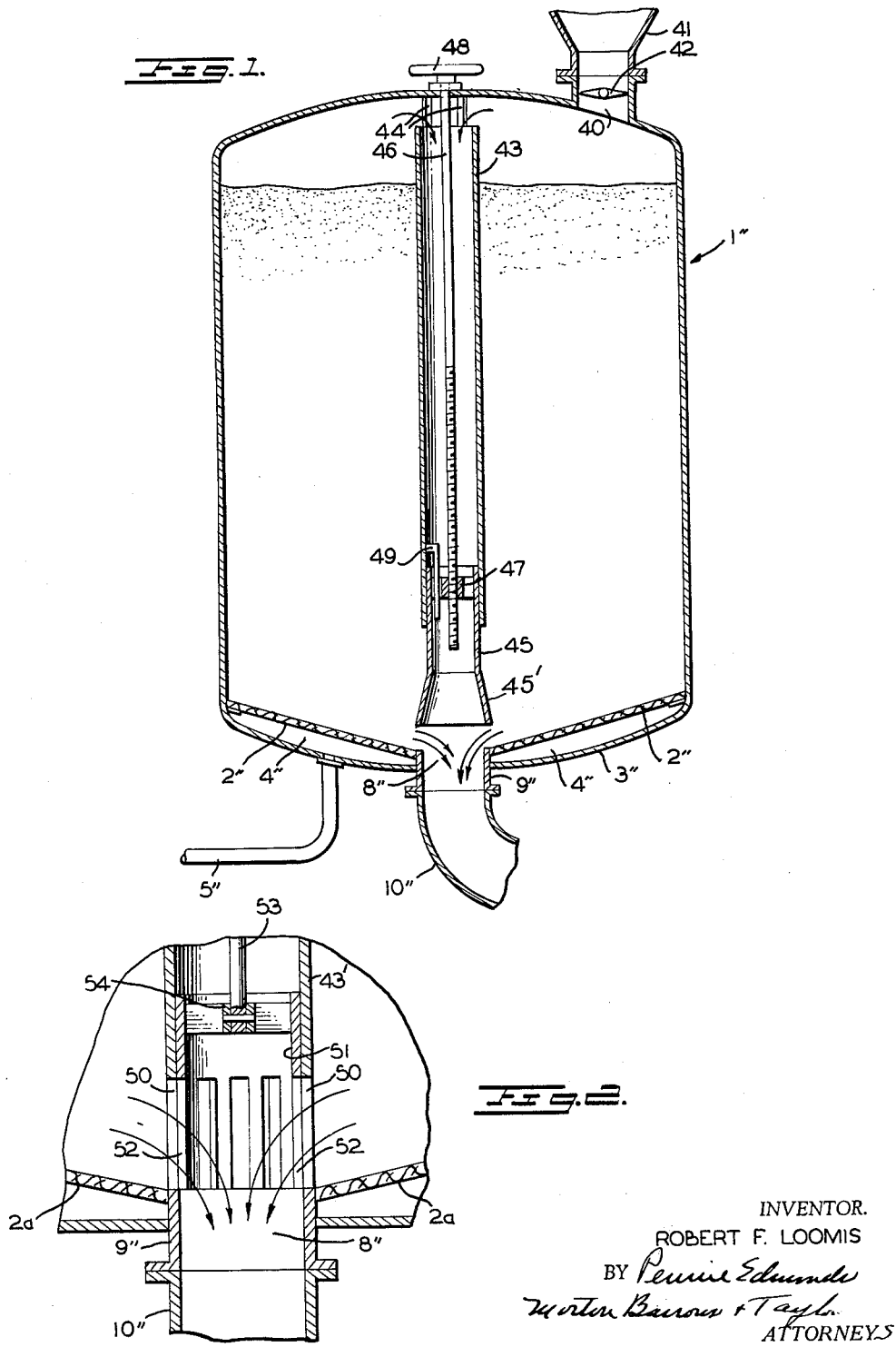

The present invention relates to the conveying of pulverulent material and particularly to a pressurized vessel in which such material may be stored and from which it subsequently may be discharged into a conveying conduit to be carried therethrough by a gas stream.

In my co-pending application Serial No. 678,798, filed August 19, 1957, now Patent No. 2,891,817, of which this application is a continuation-in-part, I have disclosed a pressurized vessel for the storage and subsequent discharge of material into a conveying conduit in which the gas for carrying the material through the conveying conduit is taken from the pressure gas in the upper portion of the vessel. The vessel disclosed in that application is elongated in a horizontal direction and has a gas-permeable deck spaced a slight distance from the bottom of the vessel and inclined downwardly towards a discharge outlet at one end of the vessel which communicates with the conveying line. A baffle extends across the end of the vessel having the discharge outlet to hold back the main body of pulverulent material in the vessel. The baffle has an opening adjacent the gas-permeable deck and its upper side stops short of the top of the vessel to provide a passage for pressure gas from the upper part of the vessel into the space between the baffle and the adjacent end of the vessel. In operation, gas is introduced into the plenum chamber formed between the bottom of the vessel and the gas-permeable deck and passes upwardly through the deck and into the overlying material, fluidizing the same. The fluidized material flows downwardly along the upper surface of the inclined deck and through the opening in the baffle to the discharge outlet and connected conveying conduit. Since the vessel is sealed, the gas which passes from the upper surface of the fluidized material builds up a pressure in the upper portion of the vessel and upon continued introduction of the gas, passes through the space above the baffle and downwardly through the space between the baffle and the end wall of the discharge outlet. This downwardly-flowing stream of gas flows over and entrains the material on the lower end of the deck which has passed through the opening in the baffle and carries it in suspension into and through the conveying conduit to the desired location.

In many instances it is desired to discharge the material from the bottom of a vessel instead of from one end thereof, and preferably from the center of the vessel, which may be horizontally elongated or vertically disposed.

The present invention relates to a conveying system such as is disclosed in my aforesaid application, but which is particularly adapted for vessels having discharge outlets positioned at the center of their bottoms, whether the vessel is of the horizontally-elongated or vertical type.

More particularly, the vessel of the present invention has the gas-permeable deck sloping downwardly in opposite directions towards a centrally-disposed outlet in its bottom, and a gas conduit extends from just above the discharge outlet to the upper portion of the vessel. The lower end of the conduit is spaced slightly from the lower end of the inclined deck and the discharge outlet to provide a space for the flow of material from the deck into the discharge outlet. Thus, the conduit functions to limit the amount of material which may flow from the deck to the discharge outlet in a manner similar to the baffle of my aforesaid application. The gas conduit preferably is in the form of a pipe and includes adjustable means at its lower end to control the amount of pulverulent material which may flow from the discharge portion of the gas-permeable deck to the discharge outlet.

In one form of the invention, such adjustable means includes a sleeve slidable vertically in the lower end of the pipe so that its lower end can be spaced at different distances from the discharge outlet. In another form of the invention, the pipe extends all the way down to the discharge outlet and has circumferentially-spaced openings, and a valve sleeve having openings adapted to be brought into or out of registry with the openings in the pipe is mounted at the lower end of the pipe and rotatable from outside the tank, at the top, to control the flow of pulverulent material from the discharge portion of the gas-permeable deck to the discharge outlet.

Gas passing upwardly through the gas-permeable deck fluidizes the pulverulent material and causes it to flow along the deck towards the central discharge outlet, and the gas after passing through the body of fluidized pulverulent material builds up a gas pressure in the upper part of the deck. This pressure gas flows downwardly through the gas conduit extending upwardly from just above the discharge outlet and entrains the material flowing from the discharge portion of the gas-permeable deck and carries it in suspension through the discharge outlet and a conveying conduit connected thereto.

The invention will be further described in connection with the accompanying drawings, in which two embodiments of the invention are illustrated, and in which:

FIG. 1 is a vertical sectional view of a vertically-disposed cylindrical tank embodying the invention, and FIG. 2 is a detailed view showing an alternative way of controlling the flow of material to the discharge outlet of a vessel of the character shown in FIG. 1.

FIG. 1 illustrates the invention embodied in a vertically-disposed, cylindrical vessel 1″ having a gas-permeable deck 2″ spaced from the bottom of the vessel 3″ to form a plenum chamber 4″ into which gas is introduced through the gas inlet 5″ to flow through the gas-permeable deck into the overlying pulverulent material in such volume and under such pressure as to fluidize the pulverulent material and to cause it to flow along the upper surface of the gas-permeable deck towards the outlet 8″ and through it and the outlet member 9″ to the conveyor conduit 10″. The upper end of the vessel has a material-inlet opening 40 to receive pulverulent material from a material hopper 41. A valve 42 is located in the inlet opening and may be turned to a position to close the inlet and to seal the upper end of the vessel.

In this form of the invention, the gas conduit consists of a pipe 43 positioned centrally of the vessel and in alignment with the discharge outlet 8″. The lower end of the pipe 43 is spaced a substantial distance from the outlet. Its upper end is spaced from the top of the vessel to provide a passageway for the flow of pressure gas into it from the upper portion of the vessel. The pipe is supported in its spaced position from the top of the vessel by supporting straps 44.

A sleeve 45 having an outwardly-flaring lower end 45′ fits into the lower end of the pipe 43 and is reciprocably mounted therein by a rod 46. The lower end of the rod 46 threadedly engages the central portion of a spider 47 in the pipe. The upper end of the rod carries an adjusting wheel 48. The rod is mounted for rotation in the top wall of the vessel but is held against longitudinal movement. The sleeve 45 is held against free rotation by any suitable means, such as a guide 49. Hence turning the wheel 48 will cause a raising or lowering of the sleeve 45 relative to the outlet 8″ so that its lower end can be adjusted to the desired distance above the outlet to permit the desired rate of flow of material from the deck 2″ through the outlet. The diameter of the lower end of the flared portion of the sleeve is slightly greater than the diameter of the discharge outlet 8″, and the sleeve is positioned concentrically with the discharge outlet so that the lower end of the flared portion will lie outwardly beyond the edge of the discharge outlet. Thus, the gas flowing downwardly through the conduit 43 will sweep over and entrain the toe of the fluidized material surrounding the outlet.

In the operation of this embodiment of the invention, with the sleeve 45 adjusted relative to the outlet 8″ to permit the desired flow of pulverulent material from the gas-permeable deck 2″ to the discharge outlet, gas, usually air, under suitable pressure and in the desired amount, will be introduced through the gas inlet 5″ into the plenum chamber 4″ to flow through the gas-permeable deck 2″ into the overlying pulverulent material. The gas fluidizes the pulverulent material overlying the gas-permeable deck and causes it to flow along the upper surface of the deck towards the discharge outlet 8″. The gas passing from the body of fluidized material accumulates in the upper portion of the vessel and flows over the upper edge of the conduit 43 and passes, as a flowing stream, downwardly through the gas conduit 43 and through the discharge outlet and outlet member 9″ into and through the conveying conduit 10″. The stream of gas flowing past the discharge portion of the gas-permeable deck impinges upon the toe of the fluidized material surrounding the discharge outlet and entrains it and carries it in suspension through the conveying conduit 10″ to the desired location.

After the vessel has been discharged of all of its contents, the sleeve 45 will be lowered to close the outlet 8″ to the flow of material from the gas-permeable deck so that when the vessel is next filled with pulverulent material, none of it will flow from the gas-permeable deck into the outlet opening 8″ until it is again desired to discharge the pulverulent material from the vessel and to convey it through the conveying conduit to the desired location.

FIG. 2 shows a modified form of means for controlling the flow of material from the gas-permeable deck of a vessel of the character shown in FIG. 1 to the discharge outlet. The control means of this figure is particularly adapted for use with the form of storage vessel shown in FIG. 1. In this embodiment, the pipe 43′, which extends from near the top of the vessel, extends all the way down to the gas-permeable deck 2ª, and its lower end is provided with a circumferential band of spaced slots 50 extending upwardly from its lower end. A sleeve 51 is mounted in the lower end of the pipe 43′ and has a circumferential band of spaced slots 52 of size, number and spacing generally corresponding to the size, number and spacing of the slots 50 in the pipe 43′.

The sleeve 51 is rigidly mounted on the lower end of a rod 53 by means of a spider member 54 extending across the inside of the sleeve. The rod 53 extends upwardly through the top of the vessel and, like the rod 46 of FIG. 1, is mounted for rotational movement but it is not mounted for vertical movement. By turning the rod 53, the sleeve 51 may be rotated and the slots 52 thereof may be brought into registry with the slots 50 of the pipe 43′ to permit discharge of the material from the vessel, or the sleeve may be turned to a position in which the portion of the sleeve between the slots thereof lies opposite the slots 50 of the pipe 43′ and completely cuts off the discharge of material through the discharge outlet.

The operation of the apparatus of FIG. 2 is the same as the operation of the apparatus of FIG. 1 except that instead of the material flowing from the discharge portion of the gas-permeable deck beneath the sleeve mounted in the gas conduit of that figure, it flows through the registered slots 50 and 52 to be entrained and carried away by the pressure gas flowing downwardly from the top of the vessel through the pipe 43′ and through the discharge outlet.

Various changes may be made in the details of construction of the conveying apparatus disclosed herein without sacrificing any of the advantages thereof or departing from the scope of the invention as set forth in the appended claims.

I claim:

1. Apparatus for discharging pulverulent material comprising a vessel having an inlet for pulverulent material, said vessel being of generally cylindrical shape and vertically disposed, a gas-permeable deck adjacent the bottom of the vessel and having a discharge portion, a plenum chamber beneath the gas-permeable deck, means for introducing gas into the plenum chamber to pass upwardly through the gas-permeable deck into overlying pulverulent material to fluidize such material, said vessel having a discharge outlet in the center of its bottom, said discharge outlet being located adjacent the discharge portion of the gas-permeable deck and forming the exit for material and gas from said vessel, a pipe having its lower end in vertical alignment with said discharge outlet, the upper end of the pipe being open to the space in the upper portion of the vessel for the flow of gas from the upper portion of the vessel into and through said pipe, means mounted at the lower end of the pipe for controlling the amount of material which may flow from the discharge portion of the gas-permeable deck to said outlet, means extending upwardly through said pipe and to the outside of the vessel for operating said controlling means, whereby gas flowing from the upper portion of the vessel through said pipe will entrain pulverulent material from the discharge portion of the gas-permeable deck and carry it, in suspension, through said discharge outlet.

2. Apparatus for discharging pulverulent material comprising a vessel having an inlet for pulverulent material, a gas-permeable deck adjacent the bottom of the vessel and having a discharge portion, a plenum chamber beneath the gas-permeable deck, means for introducing gas under pressure into said plenum chamber to pass upwardly through the gas-permeable deck into overlying pulverulent material to fluidize such material, said vessel having a discharge outlet in its bottom, said discharge outlet being located adjacent the discharge portion of the gas-permeable deck and forming the exit for material and gas from said vessel, a gas conduit having its lower end in vertical alignment with said discharge outlet, the upper end of the gas conduit being open to the space in the upper portion of the vessel for the flow of gas from the upper portion of the vessel into and through said conduit, a sleeve mounted for reciprocable movement relative to the lower end of the gas conduit so that the lower end of said sleeve may be moved to a desired position relative to said discharge outlet to control the amount of fluidized material which may flow from the discharge portion of said gas-permeable deck to said discharge outlet, whereby gas flowing from the upper portion of the container through said gas conduit will entrain pulverulent material flowing from the gas-permeable deck and carry it, in suspension, through the discharge outlet.

3. Apparatus as set forth in claim 2, in which the gas conduit is a pipe, the sleeve is generally cylindrical, and means for reciprocating the sleeve extends upwardly through the pipe and outside the top of the vessel.

4. Apparatus as set forth in claim 3, in which the lower end of the sleeve is flared outwardly.

5. Apparatus as set forth in claim 4, in which the diameter of the lower end of the flared portion of the sleeve is greater than the diameter of the discharge outlet, and the lower end of the flared portion is positioned outwardly beyond the edge of the discharge outlet.

6. Apparatus as set forth in claim 2, in which the vessel is cylindrical and vertically disposed, and the discharge outlet is in the center of the bottom.

7. Apparatus as set forth in claim 1, in which the discharge outlet is substantially circular, the gas conduit is a pipe having its lower peripheral edge terminating adjacent the edge of the discharge outlet, the lower end of the pipe has openings circumferentially spaced thereabout, a sleeve having circumferentially-spaced openings is rotatably mounted relative to the lower end of the pipe, and means are provided for rotating the sleeve relative to the pipe to bring the openings in the sleeve and in the pipe into the desired registry to regulate the amount of the material which may pass through the aligned openings to the discharge outlet.

8. Apparatus as set forth in claim 7, in which the lower end of the pipe has a circumferential series of spaced slots extending upwardly from its lower end portion, and the sleeve has a circumferential series of similarly-spaced slots extending from its lower end portion.

9. Apparatus as set forth in claim 8, in which the sleeve is mounted in said pipe.

10. In a pneumatic conveying system, the combination comprising a pressure vessel for containing bulk material to be conveyed, said vessel including a porous bottom wall which at least in part is gas pervious and through which a gas can be introduced into said vessel to aerate and fluidize bulk material therein, a plenum chamber under said gas-pervious bottom wall into which gas may be introduced for upward flow through said gas-pervious bottom wall, a conveyor conduit for conveying material from interiorly of said vessel, said conveyor conduit having its inlet opening communicating with the space within said vessel adjacent said gas-permeable bottom wall, a gas pipe in said pressure vessel having its intake end in communication with the space within said vessel and disposed with its discharge end adjacent and in substantially axial alignment with the intake opening of said conveyor conduit, and means normally defining a space in the path of gas flow between the discharge end of said gas pipe and the inlet opening of said conveyor conduit for feeding fluidized bulk material in said vessel into said inlet opening.

11. The combination of claim 10 and wherein said gas pipe comprises a gas feed-back pipe disposed wholly within said vessel and located with its intake end adjacent the top closure of said vessel.

12. The combination of claim 10 and wherein there is provided means for enlarging and narrowing the said space in the path of gas flow between said gas pipe and inlet opening to regulate the rate of feed of bulk material into said inlet opening.

13. The combination of claim 12 and wherein said last-named means is operable to adjustably enlarge and narrow said space without restricting the rate of gas flow from said gas pipe to said inlet opening.

References Cited in the file of this patent

UNITED STATES PATENTS

| | | |
|---|---|---|
| 925,591 | Pangborn | June 22, 1909 |
| 1,636,331 | Smith | July 19, 1927 |
| 2,027,697 | Nielsen | Jan. 14, 1936 |
| 2,716,050 | Hagerbaumer | Aug. 23, 1955 |
| 2,770,584 | Ray | Nov. 13, 1956 |
| 2,891,817 | Loomis | June 23, 1959 |

FOREIGN PATENTS

| | | |
|---|---|---|
| 733,887 | Great Britain | July 20, 1955 |